US007069166B2

(12) United States Patent
Underwood et al.

(10) Patent No.: US 7,069,166 B2
(45) Date of Patent: Jun. 27, 2006

(54) ELECTRONIC SYSTEMS

(75) Inventors: Lee Underwood, Bucks (GB); Mark Graeme Wilson, Bucks (GB); Jonathan Charles Fleisig, Bucks (GB)

(73) Assignee: QTV SA, St. Maurice (FR)

( * ) Notice: Subject to any disclaimer, the term of this patent is extended or adjusted under 35 U.S.C. 154(b) by 18 days.

(21) Appl. No.: 10/507,655

(22) PCT Filed: Mar. 7, 2003

(86) PCT No.: PCT/GB03/00968

§ 371 (c)(1),
(2), (4) Date: Sep. 10, 2004

(87) PCT Pub. No.: WO03/078931

PCT Pub. Date: Sep. 25, 2003

(65) Prior Publication Data

US 2005/0121981 A1 Jun. 9, 2005

(30) Foreign Application Priority Data

Mar. 15, 2002 (GB) ................................ 0206159.6

(51) Int. Cl.
*G01F 1/00* (2006.01)
*G01L 27/00* (2006.01)

(52) U.S. Cl. ...................................................... 702/100

(58) Field of Classification Search ................. 702/100
See application file for complete search history.

(56) References Cited

U.S. PATENT DOCUMENTS 4,081,744 A 3/1978 Ray
4,542,638 A 9/1985 Tlaker
4,720,800 A * 1/1988 Suzuki et al. ................. 702/46
5,191,296 A 3/1993 Novelli
5,355,735 A 10/1994 Miller et al.
5,606,516 A * 2/1997 Douglas et al. ............. 702/104
5,621,310 A 4/1997 Cosgrove et al.
5,948,995 A 9/1999 Veneruso et al.

FOREIGN PATENT DOCUMENTS

FR 2790886 9/2000

* cited by examiner

*Primary Examiner*—Bryan Bui
*Assistant Examiner*—Cindy D. Khuu
(74) *Attorney, Agent, or Firm*—Drinker Biddle & Reath LLP

(57) ABSTRACT

An electronic measuring system is described. It comprises a switch having a plurality of selectable inputs, the switch being controlled by a controller to select which of the plurality of inputs is fed to an output of the switch. The measuring system optionally includes a verification means to verify operation of the system. The verification means typically forms one or more inputs to the switch. In certain embodiments, the verification means comprises one or more fixed resistors. The output of the system is typically monitored when the or each resistor forms a part thereof. The output of the system is typically compared against previous outputs to determine if there is any change in the output. Any change in the output can be indicative of errors or other problems in the system.

27 Claims, 4 Drawing Sheets

ELECTRONIC SYSTEMS

1. Field of the invention

The present invention relates to electronic systems that are particularly, but not exclusively, suitable for use with water purification apparatus and equipment.

2. Background

It is common in electronic measuring systems to provide a means by which a value or parameter measured by the system can be checked for accuracy. It is also common in the art to provide a means for verifying that the actual measuring system is operating correctly. The verifications are generally required to ensure that consistent and accurate data is obtained from the system.

Some conventional systems provide a variable resistance equivalent to the value of the characteristic that is being measured. The variable resistance typically forms part of an amplifier feedback circuit, where the output voltage from the feedback amplifier is fed to a microcontroller that may analyse the data, make decisions based on the analysis regarding operation of the system, and provide data or warnings to the user in a desired format (e.g. as an audible and/or visual warning of a problem).

Alternatively, fixed value or discrete resistors can be used as a means of verifying that the electronic (and other) components that comprise the measuring system are working correctly and satisfactorily within operating limits. This type of verification typically requires the replacement of the component to be checked with one or more fixed resistors, and observing the final signal for analysis and comparison. The replacement with fixed resistor(s) often requires manual intervention and can be required for each amplifier circuit within the system.

In the overall system, any errors introduced in the end values in each component are compounded, and where a number of discrete amplifiers and other components are used in the system, each with their own operating parameters, tolerances and variations, the final value can vary within large ranges. In practical terms, these variations and errors limit the accuracy of the measured values.

For example, and with reference to FIG. 1, there is shown a schematic circuit diagram of a conventional electronic validation system 10 that includes three inputs; a product line cell input 12, an intermediate line cell input 14, and a post UV line cell input 16. Input 12 is fed to an input of a first line cell amplifier 18; input 14 is fed to an input of a second and separate line cell amplifier 20; and input 16 is fed to an input of a third and separate line cell amplifier 22. Each amplifier 18, 20, 22 has a respective output, each of which is fed to a separate input to a microcontroller 24.

Each amplifier 18, 20, 22 is likely to have different tolerances to the others due to manufacturing variations, and thus each will introduce a different error into the final output than the others. Consequently, three different errors from the three amplifiers 18, 20, 22 will be compounded with any errors introduced by the microcontroller 24, which may also have different errors from each of its three different inputs. Consequently, there is scope for the introduction of several different errors from several different components, making the final analysis much more difficult (in terms of comparisons) and less reliable.

SUMMARY OF THE INVENTION

According to a first aspect of the present invention, there is provided an electronic measuring system comprising a switch having a plurality of selectable inputs, the switch being controlled by a controller to select which of the plurality of inputs is fed to an output of the switch.

The measuring system optionally includes a verification means to verify operation of the system. The verification means typically forms one or more inputs to the switch. In certain embodiments, the verification means comprises one or more fixed resistors. The output of the system is typically monitored when the or each resistor forms a part thereof. The output of the system is typically compared against previous outputs to determine if there is any change in the output. Any change in the output can be indicative of errors or other problems in the system.

The switch typically comprises an analogue switch, and in certain embodiments is a multiplexer. The switch may be a digital or other switch.

The controller is typically a microcontroller, although a programmable logic controller (PLC), computer or the like may be used.

Each input to the switch typically has its own address. Thus, the controller typically sends the address to the switch corresponding to a particular input, and the particular input is typically fed to the output of the switch. The controller can be used to select each input in sequence. Thus, each input is sequentially fed to the output of the switch. In this way, the output of the system corresponding to each input is sequentially monitored. Further, the or each verification means can also be sequentially fed to the output of the switch. Thus, the system can be repeatedly and periodically checked to ensure that it is functioning correctly. This has the advantage that any errors or other problems in the system (e.g. component failure) can be detected and remedied quickly. The system can also comprise warning means to warn the user (e.g. via audible and/or visual indicia) that the system may be generating potentially erroneous data.

The output of the switch is typically fed to an amplifier. The amplifier can be of any conventional type, and typically forms part of an amplifier circuit. The output of the amplifier is typically fed to the controller. Thus, the controller can process, record and/or display the results to a user. Thus, only one amplifier is required.

In certain embodiments, one or more of the inputs comprise a signal from a line cell. The or each line cell could typically be used to measure the resistivity of water. The controller can be used to calculate the flow rate of the water based on the resistivity values from the or each line cell. The line cells can be positioned at various spaced-apart locations in water conduits, pipes and plant.

According to a second aspect of the present invention, there is provided a method of measuring an output of an electronic circuit, the circuit having a plurality of selectable inputs, the method comprising the steps of selecting one of the inputs, and monitoring the output.

The step of selecting one of the inputs typically comprises the step of sending an address to a switch, the address corresponding to a particular input. The switch typically comprises a multiplexer or any other digital or analogue switch.

The step of monitoring the output typically comprises one, some or all of the additional steps of feeding the output to a controller, recording the output, displaying the output, and/or comparing the output to a previous output.

The step of feeding the output to a controller optionally includes the additional step of amplifying or attenuating the output.

Optionally, the method may include the additional step of validating the output. The step of validating the output typically comprises one, some or all of the additional steps of selecting an input corresponding to a verification means, and comparing the output with previous outputs.

The method typically includes the additional steps of sequentially selecting each input and monitoring the output for each input. Optionally, the output is recorded and/or displayed.

BRIEF DESCRIPTION OF THE DRAWINGS

Embodiments of the present invention shall now be described, by way of example only, and with reference to the accompanying drawings, in which.

DETAILED DISCUSSION OF THE DRAWINGS

Figure 1:
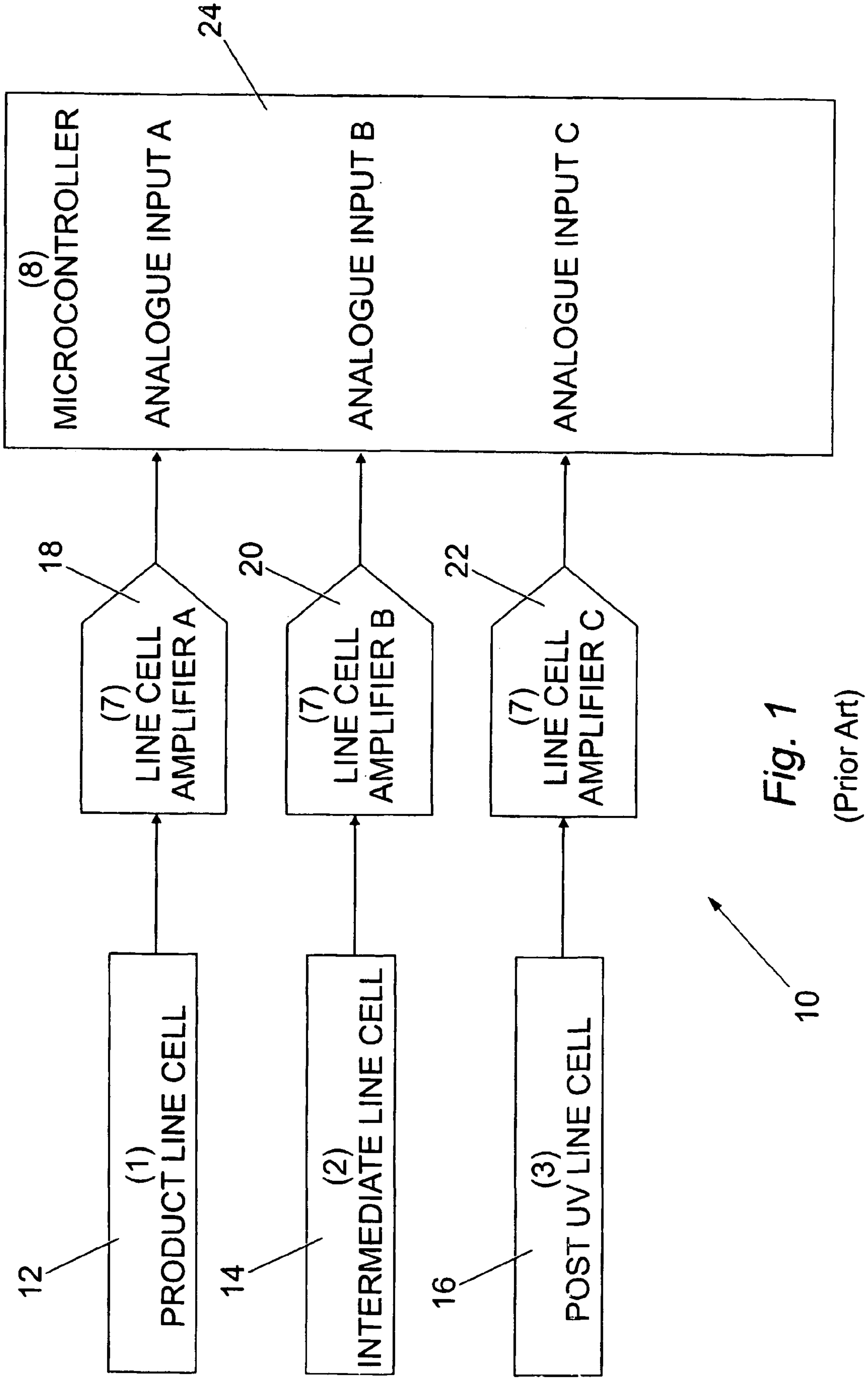
Fig. 1 (Prior Art)
FIG. 1 is a schematic block diagram of a prior art electronic validation system.

Referring to the drawings, there is shown an exemplary embodiment of an electronic validation system, generally designated 50. In this particular embodiment, the system 50 is being used in relation to a water purification system that includes measuring the conductivity or flow rate of the water in the purification system. However, those of skill in the art will recognise that the validation system 10 has wider applications and could be used with other measurement systems.

Figure 2:
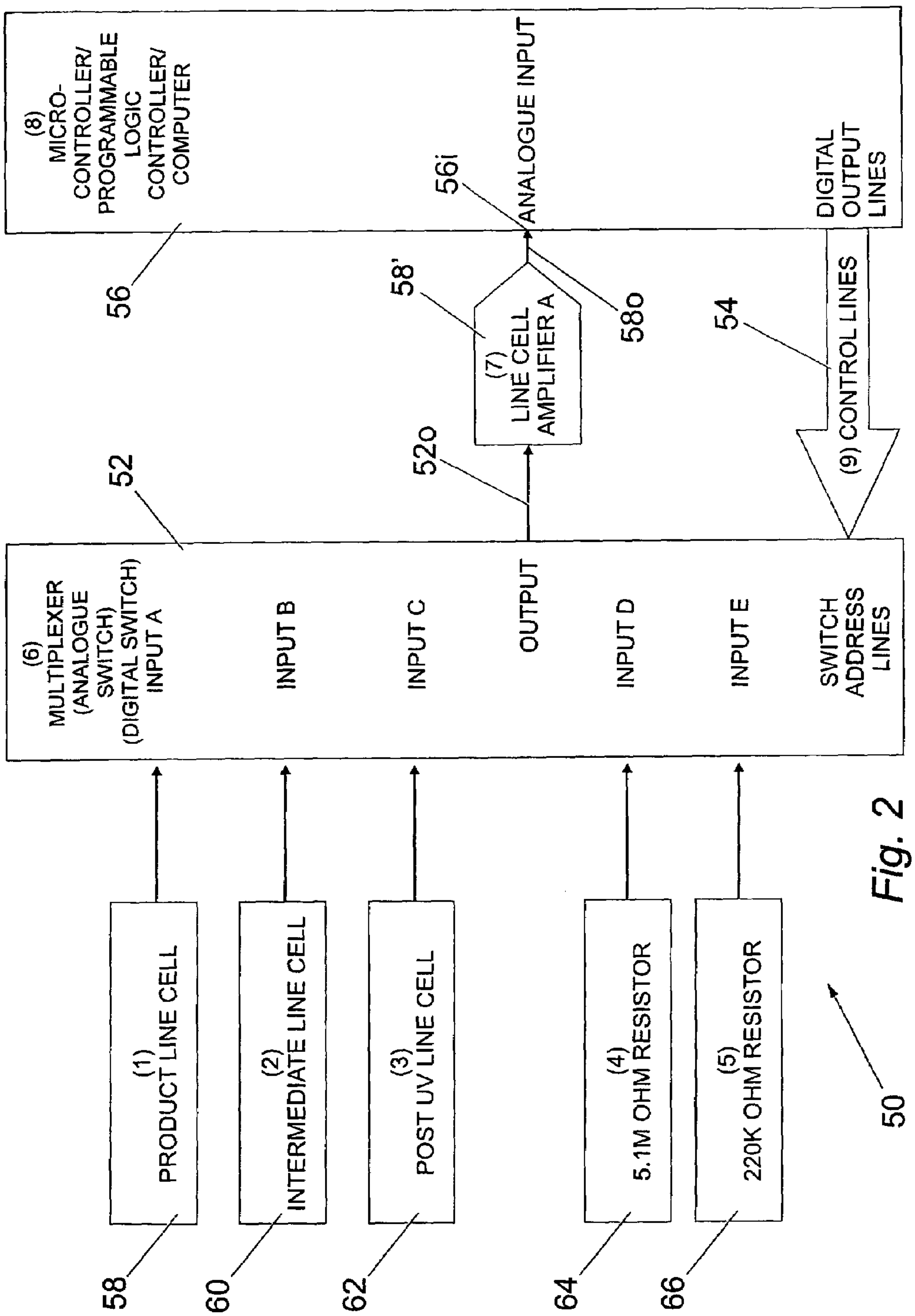
FIG. 2 is a schematic block diagram of an exemplary embodiment of an electronic validation system.

Referring in particular to FIG. 2, the system 50 includes a multiplexer (commonly abbreviated to "mux") 52. As is known in the art, the mux 52 has a plurality of inputs, each of which can be individually addressed and thereby transferred to an output 52*o* of the mux 52. In this example, the address of each input is selected and controlled by a plurality of control lines (schematically shown as 54) from a digital output of a microcontroller 56.

The mux 52 in this example has five selectable inputs. The first input A is from a product line cell 58; the second input B is from an intermediate line cell 60; and the third input C is from a post UV line cell 62. The cells 58, 60, 62 are used to measure the conductivity or flow rate of water in water purification equipment, apparatus or installation (not shown). The cells 58, 60, 62 have been shown schematically in FIG. 2, and represented by appropriate MOLEX™ connectors in FIGS. 3 and 4, the cells 58, 60, 62 being coupled to the connectors in a known manner.

An advantage of use of the mux 52 is that one of the inputs A, B, C from the line cells 58, 60, 62 can be selectively fed to the output 52*o*, depending upon the address that is sent to the mux 52 via the microcontroller 56 and control lines 54. Thus, the mux 52 is acting as an analogue switch to switch between the inputs A, B, C and determine which of these is fed to the output 52*o*.

The output 52*o* of the mux 52 is fed to an amplifier 58, and thus one of the inputs A, B, C can be selectively fed to the input of the amplifier 58'. An output 58*o* of the amplifier 58' is fed to an analogue input 56*i* of the microcontroller 56. The microcontroller 56 can then perform its analysis, calculation, data processing, display (using an appropriate device) and/or storage of the results (using built-in memory or a separate discrete memory storage device).

The microcontroller 56 can be used to poll or scan each input A, B, C on a rotational or other basis, so that input A is fed to the amplifier 58' and the result monitored by the microcontroller 56, followed by selection of input B and then input C. The control lines 54 from the digital output of the microcontroller 56 are used to adjust the switching address in the mux 52, and thus control which input A, B, C is fed to the amplifier 58' at any given time.

Use of the mux 52 thus has the advantage that a separate, discrete amplifier is not required for each input A, B, C, unlike in conventional systems (e.g. system 10 shown in FIG. 1). Consequently, fewer errors are introduced at the analogue input 56*i* of the microcontroller 56, thus resulting in more accurate results. Further, use of the mux 52 has the advantage that the number of discrete components can be reduced, leading to a cost saving. Further, the complexity of the overall design is reduced, leading to a further cost saving in terms of design and layout, and a reduction in the size of a printed circuit board (PCB) used for the system 50. These are significant advantages over prior art systems. Furthermore, there is a reduction in production test time, as only one amplifier needs to be calibrated. This reduces the time on site that an installer needs to properly calibrate the system.

The mux 52 is provided with two further inputs; input D is from a 5.1 Mega-ohm resistor 64, and input D is from a 220 kilo-ohm resistor 66. It will be appreciated that the values of the resistors 64, 66 can be chosen to suit the particular application, and that the values given here are exemplary only. The output 52*o* of the mux 52 is used as part of a feedback circuit to the resistors 64, 66, as best shown in FIG. 2.

The resistors 64, 66 are typically EUROHM™ SMR 126 resistors, and may be of high quality and typically traceable to the relevant standard. Further, the manufacturing and operating tolerances of the resistors 64, 66 are quite low, with a typical tolerance of ±1%.

As part of the scanning sequence performed by the microcontroller 56 in conjunction with the mux 52, the outputs from the amplifier 58' when fed by one or other of the resistors 64, 66 can be measured. That is, by selecting the appropriate address in the mux 52 using the control lines 54, one of the resistors 64, 66 can be fed to the output 52*o* of the mux 52, and thus to the input of the amplifier 58'. The inclusion of one or other of the resistors 64, 66 in the amplifier 58 circuit can be used to verify that the system 50 is operating correctly by comparing the value obtained at the microcontroller 56 (i.e. the output of the amplifier 58') when a given resistor 64, 66 is coupled into the circuit in place of one of the inputs A, B, C, and this value can then be recorded or stored by the microcontroller 56 for comparison with previously stored values. If the currently obtained value using one of the resistors 64, 66 varies from a previously stored value or values for the same resistor 64, 66 (taking into account any tolerances), then it can be assumed that there is a problem with or some error in the system 50. For example, one or more of the components may not be operating correctly, resulting in erroneous data.

Thus, a user of the system 50 can be informed promptly and warned of possible errors in the data obtained from the system 50, and can thus take remedial action to find the problem and rectify it.

This automatic verification of system operability is advantageous in that the possibility of damage to the system 50, and any component therein is reduced. Further, the verification checks performed can be more reliable and accurate.

It will be appreciated that all components within the system 50 are typically surface mount components, although discrete components may also be used. Surface mount is preferred because of the advantages thereof (e.g. reduction in overall size).

The system 50 has applications in relation to measuring the flow rate, and indeed for other suitable measurements, of water through a unit, plant, pipe or other conduit. Conventionally, the flow rate of water is based on a measure of the resistivity of the water, and the line cells 58, 60, 62 (i.e. inputs A, B and C) each measure the resistivity of the water at three spaced-apart locations. It will be appreciated that the resistivity of the water can be measured at any number of suitable locations, and each input from a corresponding line cell (e.g. line cells 58, 60, 62) coupled as an input to the mux 52. As before, each input to the mux 52 can be individually addressed by the microcontroller 56, and thus any one of a plurality of inputs to the mux 52 can be fed to the output thereof under the control of the microcontroller 56.

The outputs from the line cells 58, 60, 62 can be sequentially fed or otherwise selectively fed to the output of the mux 52, and the resistivity value of the water from the or each line cell 58, 60, 62 amplified (by amplifier 58') and fed to the microcontroller 56, which can then perform calculations to determine the flow rate of water at the point where the measurement of resistivity was taken in a conventional manner. The system 50 can thus be used to check for blockages or restrictions (by actively checking for reductions or variations in flow rate) by measuring the flow rate at each cell 58, 60, 62 and comparing the current values with those previously stored. This can be done in real-time. Other applications of the system 50 will be apparent to those of skill in the art.

In particular, the system 50 can be used in relation to nuclear or hydro power stations where a constant flow of water is preferred. One or more line cells 58, 60, 62 can be included in the water (or other liquid) feeds to these stations, and the flow rate monitored to ensure that adequate flow rates are provided.

In certain embodiments, the system 50 has further advantages in that the accuracy and operability of the system 50 can be periodically and automatically checked (using one or more of the fixed value resistors 64, 66), and thus the user can have greater confidence in the results obtained.

Use of the system 50 herein can reduce the inaccuracy thereof considerably, and in some instances, the accuracy can be ±1% or less. This is considerably less then many conventional systems. Indeed, it may be possible to give results with an accuracy of ±0.05%.

The system 50 can be calibrated using know calibration techniques, but unlike some conventional systems, only one calibration process is required for all water flow rate measurements.

Figure 3:
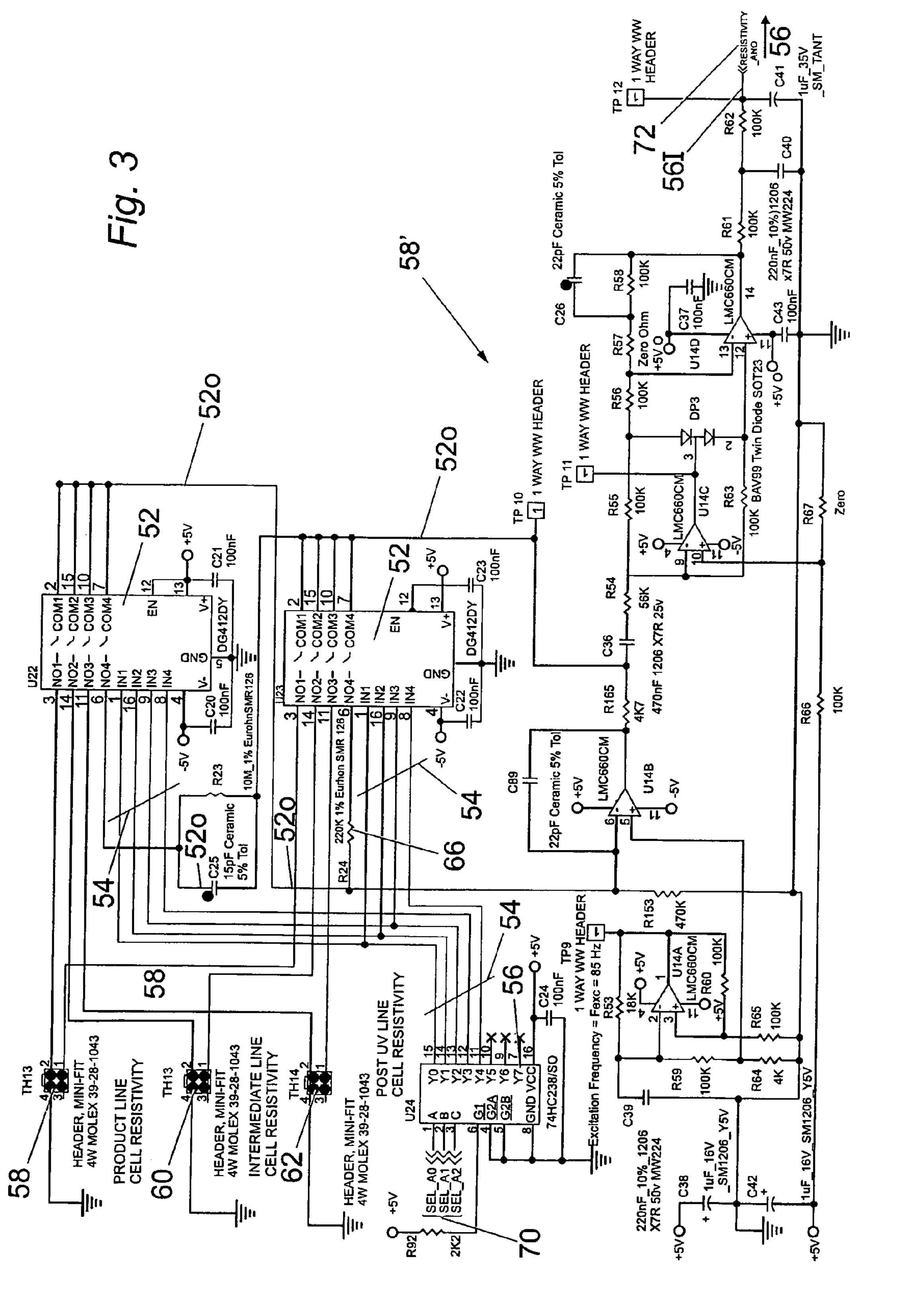
FIGS. 3 and 4 are detailed circuit diagrams showing an exemplary circuit implementation of the system of FIG. 2.
Figure 4:
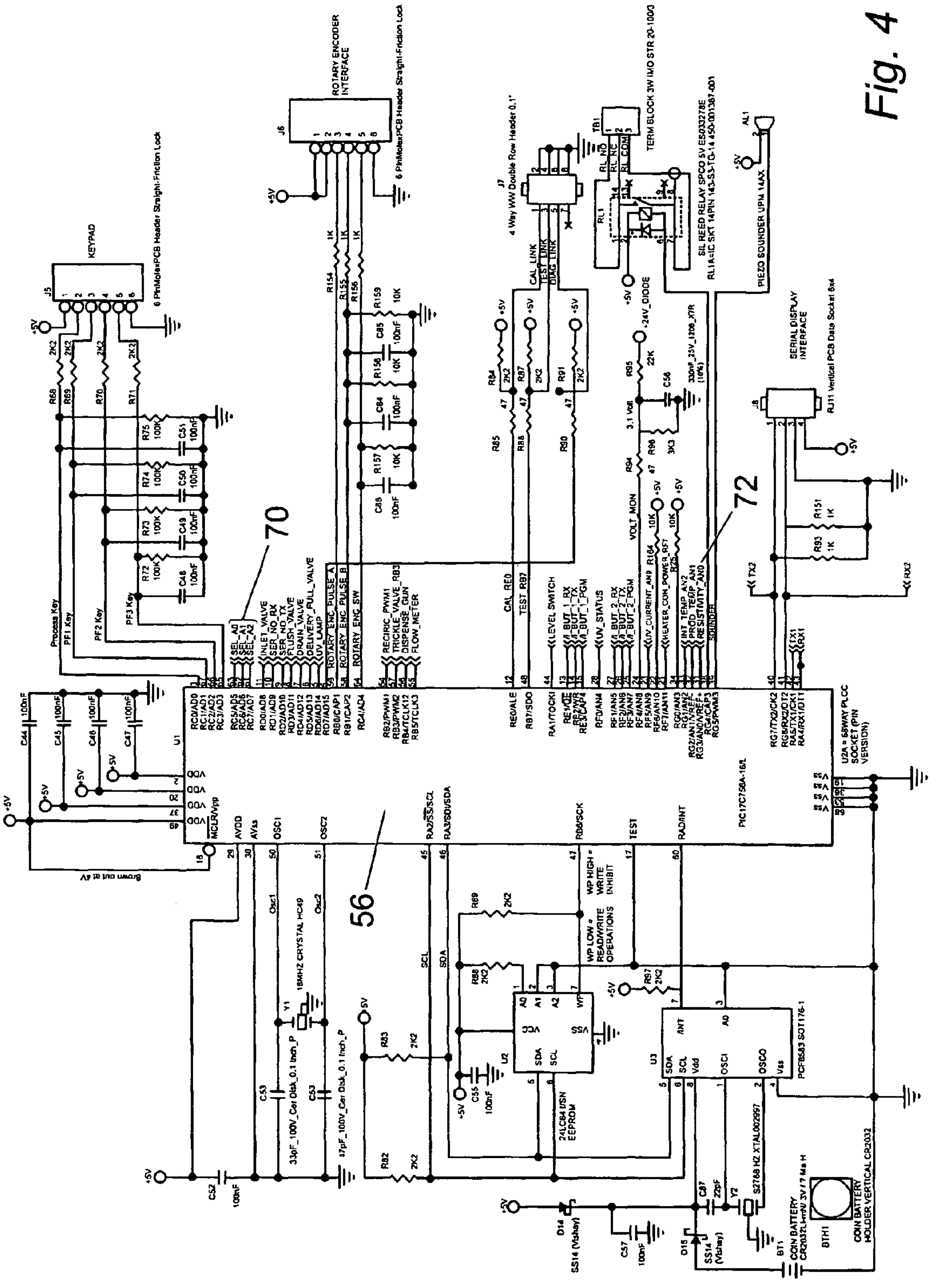

FIGS. 3 and 4 are detailed circuit diagrams showing an exemplary circuit implementation of the system described above. A signal 56*i* (shown in FIG. 3) is input to the microcontroller 56, which is illustrated in FIG. 4. Reference numeral 72 (see both FIGS. 3 and 4) shows where the signal is fed into the microcontroller 56. Similarly, reference numeral 70 serves to indicate where outputs from the microprocessor of FIG. 4 are fed into the address select lines of the decoder of FIG. 3. The outputs of the decoder 54 are the control lines of the MUX 52 that is acting as an analogue switch. These control lines are used to select which of the inputs of the MUX 52 are fed to the output 52*o*.

It will be appreciated by those of skill in the art, that certain embodiments of the system 50 described herein are particularly useful for TOC measurements.

It will also be appreciated that the measuring system described above can function as an electronic validation system.

Modifications and improvements may be made to the foregoing without departing from the scope of the present invention. For example, the system described herein can be modified to provide for verification of data obtained from other electronic measuring systems. Further, where one component has been described as performing one function, several components can be used to provide the same function. It will be appreciated that the description herein refers to use of a multiplexer, but it will be appreciated that any analogue or digital switch can be used.

The invention claimed is:

1. An electronic measuring system for a liquid purification system comprising a switch comprising a multiplexer having a plurality of selectable inputs, the switch being controlled by a controller to select which of the plurality of inputs is fed to an output of the switch, and a verification means to verify operation of the system, which forms one or more inputs to the switch, wherein one or more of the inputs comprises a signal from a line cell, the line cell being suitable for measuring at least one characteristic of a liquid for use in a purification system.

2. The measuring system of claim 1, wherein the verification means comprises one or more fixed resistors.

3. The measuring system of claim 1, wherein the switch comprises an analogue switch.

4. The measuring system of claim 1, wherein the switch comprises a digital switch.

5. The measuring system of claim 1, wherein the controller is a microcontroller.

6. The measuring system of claim 1, wherein the controller is a programmable logic controller (PLC), computer or the like.

7. The measuring system of claim 1, wherein each input to the switch has its own address.

8. The measuring system of claim 7, wherein the or each verification means is operable to be sequentially fed to the output of the switch.

9. The measuring system of claim 1, wherein the controller is operable to send an address to a switch corresponding to a particular input, and the particular input is fed to the output of the switch.

10. The measuring system of claim 1, wherein the controller is operable to select each input in sequence.

11. The measuring system of claim 10, wherein each input can be sequentially fed to the output of the switch, to sequentially monitor the output of the system corresponding to each input.

12. The measuring system of claim 1, comprising warning means to indicate to a user that the system may be generating potentially erroneous data.

13. The measuring system of claim 12, wherein the warning means comprises audible and/or visual indicia.

14. The measuring system of claim 1, wherein the output of the switch is operable to be fed to an amplifier, the amplifier forming part of an amplifier circuit.

15. The measuring system of claim 14, wherein the output of the amplifier is fed to the controller so that the controller can process, record and/or display the results to a user.

16. The measuring system of claim 15, comprising a single amplifier.

17. The measuring system of claim 1, wherein the at least one characteristic of a liquid that is measured is the conductivity of water.

18. The measuring system of claim 17, wherein the line cells are positioned at various spaced-apart locations in water conduits, pipes and plant.

19. The measuring system of claim 1, wherein the at least one characteristic of a liquid that is measured is the flow of water.

20. The measuring system of claim 19, wherein the line cells are positioned at various spaced-apart locations in water conduits, pipes and plant.

21. A method of measuring an output of an electronic circuit of a purification system, the circuit comprising a multiplexer having a plurality of selectable inputs, wherein one or more of the inputs comprises a signal from a line cell, the line cell being suitable for measuring at least one characteristic of a liquid for use in a perification system, the method comprising the steps of selecting one of the inputs, monitoring the output, and validating the output, said validation step comprising the additional steps of: selecting an input corresponding to a verification means; and comparing the output with previous outputs.

22. The method of claim 21, wherein the step of selecting one of the inputs comprises the step of sending an address to a switch, the address corresponding to a particular input.

23. The method of claim 22, wherein the switch comprises a digital or analogue switch.

24. The method of claim 21, wherein the step of monitoring the output typically comprises one, some or all of the additional steps of:

feeding the output to a controller;

recording the output;

displaying the output; and comparing the output to a previous output.

25. The method of claim 24, wherein the step of feeding the output to a controller includes the additional step of amplifying or attenuating the output.

26. The method of claim 21 including additional steps of sequentially selecting each input and monitoring the output for each input.

27. The method of claim 26, wherein the output is recorded and/or displayed.

* * * * *

UNITED STATES PATENT AND TRADEMARK OFFICE

CERTIFICATE OF CORRECTION

PATENT NO. : 7,069,166 B2 
APPLICATION NO. : 10/507655
DATED : June 27, 2006
INVENTOR(S) : Lee Underwood et al.

It is certified that error appears in the above-identified patent and that said Letters Patent is hereby corrected as shown below:

Face page, Item (73) next to "Assignee"- change "QTV SA" to -- OTV SA --

Signed and Sealed this

Twelfth Day of September, 2006

JON W. DUDAS
*Director of the United States Patent and Trademark Office*